United States Patent
Hatano et al.

(10) Patent No.: US 10,571,784 B2
(45) Date of Patent: Feb. 25, 2020

(54) PROJECTION OPTICAL DEVICE AND PROJECTOR

(71) Applicant: SEIKO EPSON CORPORATION, Tokyo (JP)

(72) Inventors: Takuya Hatano, Matsumoto (JP); Naoto Takehana, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 11 days.

(21) Appl. No.: 15/557,165

(22) PCT Filed: Mar. 2, 2016

(86) PCT No.: PCT/JP2016/001140
§ 371 (c)(1),
(2) Date: Sep. 11, 2017

(87) PCT Pub. No.: WO2016/157722
PCT Pub. Date: Oct. 6, 2016

(65) Prior Publication Data
US 2018/0046068 A1 Feb. 15, 2018

(30) Foreign Application Priority Data
Mar. 27, 2015 (JP) .................................. 2015-065938

(51) Int. Cl.
*G03B 21/14* (2006.01)
*G02B 15/163* (2006.01)
*G02B 15/20* (2006.01)
*G02B 27/14* (2006.01)
(Continued)

(52) U.S. Cl.
CPC ........... *G03B 21/142* (2013.01); *G02B 7/021* (2013.01); *G02B 7/10* (2013.01); *G02B 15/163* (2013.01);
(Continued)

(58) Field of Classification Search
CPC .................. G03B 21/142; G03B 21/28; G03B 21/00–64; G02B 15/20; G02B 15/163;
(Continued)

(56) References Cited

U.S. PATENT DOCUMENTS 6,028,716 A * 2/2000 Kato .................... G02B 15/177
359/676
2001/0043411 A1 * 11/2001 Emura ................... G02B 7/021
359/819
(Continued)

FOREIGN PATENT DOCUMENTS

JP  2002-107611 A  4/2002
JP  2006-023359 A  1/2006
(Continued)

OTHER PUBLICATIONS

May 31, 2016 International Search Report issued in Patent Application No. PCT/JP2016/001140.

*Primary Examiner* — Cara E Rakowski
*Assistant Examiner* — Christopher A Lamb, II
(74) *Attorney, Agent, or Firm* — Oliff PLC (57) ABSTRACT

A projection optical device includes a fourth lens group movable along an optical axis, a fifth lens group provided in a position maintained within the projection optical device, a fourth lens frame holding the fourth lens group and having cam pins, a guide tube having a rectilinear groove, the cam pins inserted into the rectilinear groove, and a cam tube rotated with respect to the guide tube to guide the cam pins with the rectilinear groove and the cam groove, and moving the fourth lens frame along the optical axis, wherein the cam pins are formed on an upstream side in an optical path of the fourth lens group in a direction along the optical axis, and the fifth lens group is provided on the upstream side in the optical path of the fourth lens group.

8 Claims, 6 Drawing Sheets

(51) Int. Cl.
*G02B 7/02* (2006.01)
*G02B 7/10* (2006.01)
*G03B 21/28* (2006.01)
*G03B 21/20* (2006.01)
*G03B 21/00* (2006.01)
*H04N 9/31* (2006.01)
*G02B 15/17* (2006.01)

(52) U.S. Cl.
CPC ........... *G02B 15/20* (2013.01); *G03B 21/008* (2013.01); *G03B 21/208* (2013.01); *G03B 21/28* (2013.01); *H04N 9/3105* (2013.01); *H04N 9/3141* (2013.01); *G02B 15/17* (2013.01); *G02B 27/141* (2013.01); *H04N 9/315* (2013.01); *H04N 9/317* (2013.01)

(58) Field of Classification Search
CPC .......... G02B 7/10; G02B 7/021; G02B 7/105; G02B 7/04
See application file for complete search history.

(56) References Cited

U.S. PATENT DOCUMENTS

| | | | |
|---|---|---|---|
| 2002/0039239 A1 | 4/2002 | Hosoya | |
| 2006/0007564 A1 | 1/2006 | Sakamoto et al. | |
| 2007/0195292 A1* | 8/2007 | Shindo | G03B 21/142 |
| | | | 353/101 |
| 2010/0053737 A1* | 3/2010 | Fujita | G02B 17/08 |
| | | | 359/364 |
| 2014/0333907 A1 | 11/2014 | Takehana | |

FOREIGN PATENT DOCUMENTS

| | | |
|---|---|---|
| JP | 2009-145368 A | 7/2009 |
| JP | 2010-169915 A | 8/2010 |
| JP | 2014-202882 A | 10/2014 |
| JP | 2014-219581 A | 11/2014 |

* cited by examiner

PROJECTION OPTICAL DEVICE AND PROJECTOR

TECHNICAL FIELD

This invention relates to a projection optical device and a projector.

BACKGROUND ART

In related art, a projector including a light source, a light modulation device that modulates light output from the light source according to image information, and a projection optical device that projects the light modulated by the light modulation device is known. The projection optical device has a plurality of lens groups. Further, of the plurality of lens groups, a projection lens (projection optical device) having the lens group adapted to be movable along an optical axis and a projector including the projection lens are disclosed (for example, see PTL 1).

The projection lens described in PTL 1 includes first to fifth lens groups, a focus tube that holds the first lens group, three lens frames that respectively hold the second to fourth lens groups, a guide tube, a cam tube, and a fixed frame that supports the guide tube. Each lens frame has a cam pin that engages with a rectilinear groove of the guide tube and a cam groove of the cam tube and is inserted into the guide tube. The fifth lens group is held by the fixed frame.

Then, when the focus tube is rotated, the first lens group moves and focus adjustment is made, and, when the cam tube is rotated, the second to fourth lens groups move and zoom adjustment is made.

CITATION LIST

Patent Literature

PTL 1: JP-A-2014-219581

SUMMARY OF INVENTION

Technical Problems

However, the projection lens described in PTL 1 has a problem that downsizing is difficult because the cam tube is formed to be longer in a direction along the optical axis to coverall of the movable second to fourth lens groups. Further, in the projection lens adapted to make zoom adjustment by image processing and focus adjustment by rotation of the cam tube using the technology described in PTL 1, the factor of the cam tube determining the size of the projection lens becomes larger and the problem becomes more significant. That is, in the technology described in PTL 1, there is a problem that downsizing of the projection lens, i.e., downsizing of the projector is difficult.

Solution to Problems

The invention has been achieved to solve at least a part of the above described problem, and can be realized as the following embodiments or application examples.

APPLICATION EXAMPLE 1

A projection optical device according to the application example is a projection optical device having a plurality of lens groups provided along an optical axis, including a mobile lens group movable along the optical axis, a fixed lens group provided adjacent to the mobile lens group in a position maintained within the projection optical device, a mobile frame holding the mobile lens group and having a cam pin protruding in a direction orthogonal to the optical axis, a guide tube having a rectilinear groove extending in a direction parallel to the optical axis, the cam pin inserted into the rectilinear groove, and a cam tube into which the guide tube is fit-inserted, having a cam groove with which the cam pin protruding from the rectilinear groove engages, rotated with respect to the guide tube to guide the cam pin with the rectilinear groove and the cam groove, and moving the mobile frame along the optical axis, wherein the cam pin is formed on one side of the mobile lens group in a direction along the optical axis, and a fixed lens closest to the mobile lens group side of the fixed lens group is provided within the mobile frame on the one side.

According to the configuration, in the mobile frame holding the mobile lens group, the cam pin is formed on one side of the mobile lens group in the direction along the optical axis, and the fixed lens closest to the mobile lens group side of the fixed lens group is provided on the same side as the side on which the cam pin is formed within the mobile frame. Thereby, the cam tube may be formed with suppressed extension of the cam tube toward the opposite side to the above described one side in the direction along the optical axis. Further, the fixed lens closest to the mobile lens group side may be provided in proximity to the mobile lens group, and thereby, compared to the configuration in which the fixed lens group is provided apart from the mobile lens group, even when a lens having a larger outer diameter is used, upsizing of the projection optical device can be suppressed. Therefore, the projection optical device with improved optical performance and reduced size on the opposite side to the above described one side can be provided.

APPLICATION EXAMPLE 2

In the projection optical device according to the application example, the fixed lens is provided between the cam pin and the mobile lens group in the direction along the optical axis.

According to the configuration, the cam pin is formed in a position farther from the mobile lens group as the fixed lens is provided between the mobile lens group and itself. Therefore, the cam tube may be formed with further suppressed extension of the cam tube toward the opposite side to the above described one side.

APPLICATION EXAMPLE 3

In the projection optical device according to the application example, it is preferable that a fixed frame holding the fixed lens group and supported by the guide tube is provided, and the fixed frame has an insertion portion inserted into the mobile frame and holding the fixed lens with the insertion portion.

According to the configuration, the fixed lens group is held by the above described fixed frame, and thereby, the fixed lens group may be reliably provided within the mobile frame. Further, in the configuration in which the fixed lens group is held by the guide tube and the fixed lens is provided within the mobile frame, the shapes of the guide tube and the mobile frame become complex and the manufacture of these members is harder, however, the fixed lens group is held by the fixed frame separately provided from the guide tube, and thereby, the shapes of these members can be simplified and easily manufactured.

APPLICATION EXAMPLE 4

In the projection optical device according to the application example, it is preferable that the guide tube has a first tubular portion into which the fixed frame and the mobile frame can be inserted in this order from an opposite side to the one side, a second tubular portion formed on the one side of the first tubular portion and having an inner diameter smaller than an inner diameter of the first tubular portion, and a supporting part that connects the first tubular portion and the second tubular portion and supports the fixed frame.

According to the configuration, the fixed frame and the mobile frame are inserted into the first tubular portion from the opposite side to the one side and end portions on the one side are supported by the supporting part and provided in the first tubular portion. Thereby, the projection optical device can be adapted so that the guide tube may support the lens group having the smaller outer diameter than the outer diameter of the fixed lens group by the second tubular portion while securing the configuration in which the fixed lens group is provided within the mobile frame. Therefore, the projection optical device with further improved optical performance and reduced size can be provided.

APPLICATION EXAMPLE 5

In the projection optical device according to the application example, it is preferable that the one side is an upstream side in an optical path.

According to the configuration, the projection optical device with suppressed extension of the cam tube toward a downstream side in the optical path may be formed.

APPLICATION EXAMPLE 6

In the projection optical device according to the application example, it is preferable that a first optical system having the mobile lens group and the fixed lens group, and a second optical system that reflects light output from the first optical system are provided.

According to the configuration, the light from the first optical system can be changed in direction and wide-angled by the second optical system. Further, the second optical system is adapted so that the light reflected by the second optical system may pass through a vicinity of the first optical system, and thereby, the projection optical device that projects light from a vicinity of a projection surface may be provided. Furthermore, in the first optical system, the extension of the cam tube is suppressed on the downstream side in the optical path, and thereby, the region in which the light reflected by the second optical system is not blocked by the first optical system may be formed to be wider. Therefore, the low-offset projection optical device that can be provided close to the projection surface and wide-angled with the optical axis close to the projection surface may be provided.

APPLICATION EXAMPLE 7

In the projection optical device according to the application example, it is preferable that the mobile lens group is a lens group that contributes to focus adjustment.

According to the configuration, the projection optical device having a function of focus adjustment and exerting the above described advantages may be provided.

APPLICATION EXAMPLE 8

A projector according to the application example includes a light source, a light modulation device that modulates light output from the light source according to image information, and the above described projection optical device that projects the light modulated in the light modulation device.

According to the configuration, the projector includes the above described projection optical device, and thereby, downsizing may be realized and projection of images with good image quality can be performed.

DESCRIPTION OF EMBODIMENTS

As below, a projector according to the embodiment will be explained with reference to the drawings.

The projector of the embodiment is adapted to project an image on a projection surface of a screen or the like in a state in which the projector is supported by a support provided on a wall surface or the like or mounted on a desk or the like.

Figure 1:
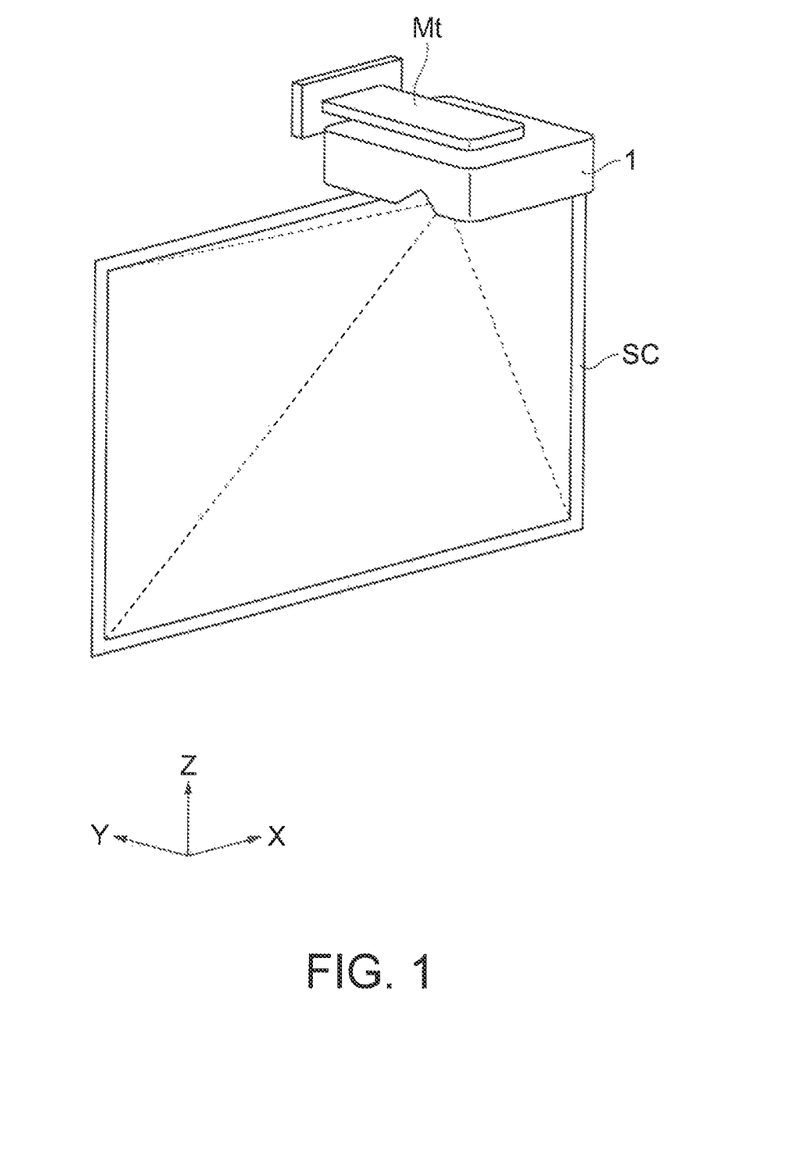
FIG. 1 is a schematic view showing an example of a usage of a projector of the embodiment.

FIG. 1 is a schematic view showing an example of a usage of the projector 1 of the embodiment. Specifically, FIG. 1 schematically shows the projector 1 supported by a support Mt provided on a wall surface and a screen SC provided on the wall surface.

As shown in FIG. 1, the projector 1 is provided above the screen SC and projects an image on the screen SC from a side downward. Note that, as below, for convenience of explanation, in the projector 1 supported by the support Mt, normal directions to the wall surface (screen SC) are frontward and backward directions, and the direction toward the wall surface is a frontward direction (+Y-direction), a direction opposite to the gravity force is an upward direction (+Z-direction), and a right side when facing the wall surface is a rightward direction (+X-direction). Further, the projector of the embodiment is adapted to project an image even in an attitude in which the +Y-side or +Z-side in the attitude shown in FIG. 1 is mounted on a desk, floor, or the like.

[Main Configuration of Projector]

Figure 2:
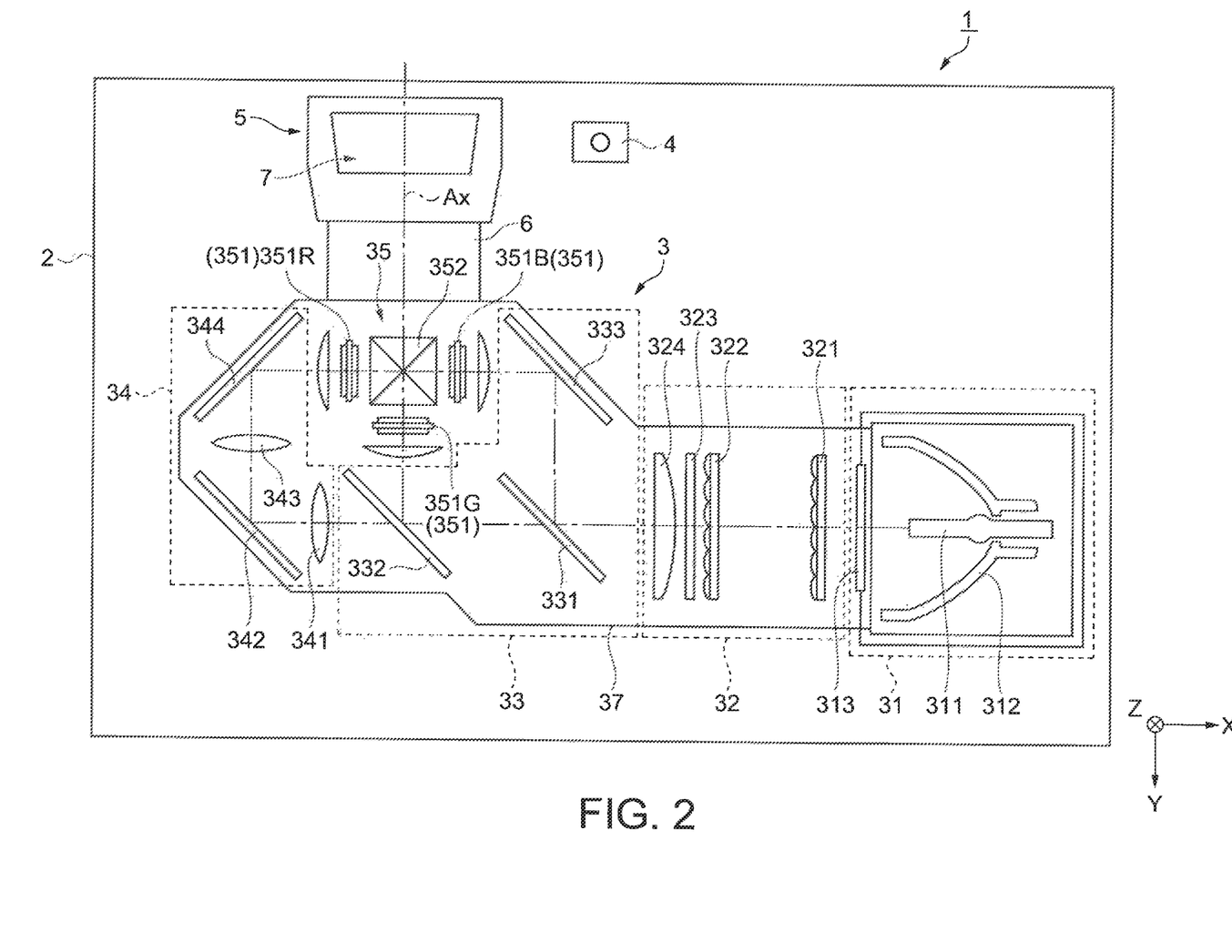
FIG. 2 is a schematic view showing a general configuration of the projector of the embodiment.

FIG. 2 is a schematic view showing a general configuration of the projector 1 of the embodiment.

As shown in FIG. 2, the projector 1 includes an exterior casing 2 forming an exterior, a control unit (not shown), an optical unit 3 having a light source device 31, and an imaging device 4. Note that, though not shown, inside of the exterior casing 2, further, a power supply device that supplies electric power to the light source device 31, the control unit, etc. and a cooling device that cools the optical unit 3 etc. are provided.

Though the detailed explanation is omitted, the exterior casing 2 includes a plurality of members, in which an air intake port thorough which outside air is taken, an exhaust port through which warmed air inside of the exterior casing 2 is exhausted to the outside, etc. are provided.

The control unit includes a CPU (Central Processing Unit), ROM (Read Only Memory), RAM (Random Access Memory), etc. and functions as a computer, and performs control of the operation of the projector 1, e.g., control relating to projection of images or the like.

The optical unit 3 optically processes and projects light output from the light source device 31 under the control by the control unit.

As shown in FIG. 2, the optical unit 3 includes an integrator illumination system 32, a color separation system 33, a relay system 34, an optical device 35, a projection optical device 5, and an optical component casing 37 for arrangement of these optical components in predetermined positions on the optical path in addition to the light source device 31.

The light source device 31 includes a discharge-type light source 311 of an ultrahigh pressure mercury lamp, metal halide lamp, or the like, a reflector 312, a parallelizing lens 313, etc. The light source device 31 reflects the lights output from the light source 311 by the reflector 312, and then, align the output direction by the parallelizing lens 313, and output the light to the integrator illumination system 32.

The integrator illumination system 32 includes a first lens array 321, a second lens array 322, a polarization conversion element 323, and a superimposing lens 324.

The first lens array 321 has a configuration in which small lenses are arranged in a matrix form, and divides the light output from the light source device 31 into a plurality of partial lights. The second lens array 322 has substantially the same configuration as the first lens array 321, and nearly superimposes the partial lights on a surface of a liquid crystal panel, which will be described later, with the superimposing lens 324. The polarization conversion element 323 has a function of aligning random lights output from the second lens array 322 into nearly one kind of polarized lights that can be used in the liquid crystal panel.

The color separation system 33 includes two dichroic mirrors 331, 332 and a reflection mirror 333, and has a function of separating the light output from the integrator illumination system 32 into color lights in three colors of red light (hereinafter, referred to as "R light"), green light (hereinafter, referred to as "G light"), and blue light (hereinafter, referred to as "B light").

The relay system 34 includes a light-incident side lens 341, a relay lens 343, and reflection mirrors 342, 344, and has a function of guiding the R light separated by the color separation system 33 to a liquid crystal panel for R light. Note that the optical unit 3 has the configuration in which the relay system 34 guides the R light, however, may have e.g. a configuration of guiding B light, not limited to that.

The optical device 35 includes light modulation devices 351 provided for the respective color lights (the light modulation device for R light is 351R, the light modulation device for G light is 351G, and the light modulation device for B light is 351B) and a cross dichroic prism 352 as a color combination optical device.

Each light modulation device 351 includes a transmissive liquid crystal panel, alight incident-side polarizer provided on the light incident side of the liquid crystal panel, and a light exiting-side polarizer provided on the light exiting side of the liquid crystal panel, and modulates each color light according to image information.

The cross dichroic prism 352 has a nearly square shape in the plan view formed by bonding of four right-angle prisms, and two dielectric multilayer films are formed on the interfaces on which the right-angle prisms are bonded. In the cross dichroic prism 352, the dielectric multilayer films reflect the R light and the B light modulated in the light modulation devices 351R, 351B, transmit the G light modulated in the light modulation device 351G, and combines the modulated lights in three colors.

The projection optical device 5, which will be described later in detail, includes a first optical system 6 having a plurality of lens groups provided along an optical axis Ax and a second optical system 7 that reflects light output from the first optical system 6. Further, the projection optical device 5 enlarges and projects the light combined in the cross dichroic prism 352 on the screen SC provided below the projector 1 as shown in FIG. 1.

The imaging device 4 includes an image sensor (not shown) of a CCD (Charge Coupled Device) or CMOS (Complementary Metal Oxide Semiconductor), and captures a projection surface and outputs the captured information to the control unit. Further, the imaging device 4 detects light emitted from a pointer (e.g. an electronic pen or the like) operated by a user on the projection surface and outputs detected information to the control unit. The control unit analyzes the position of the pointer based on the information output from the imaging device 4, and projects an image showing e.g. a trajectory of the pointer by points and lines based on the analysis result.

[Configuration of Projection Optical Device]

Here, the projection optical device 5 will be explained in detail.

Figure 3:
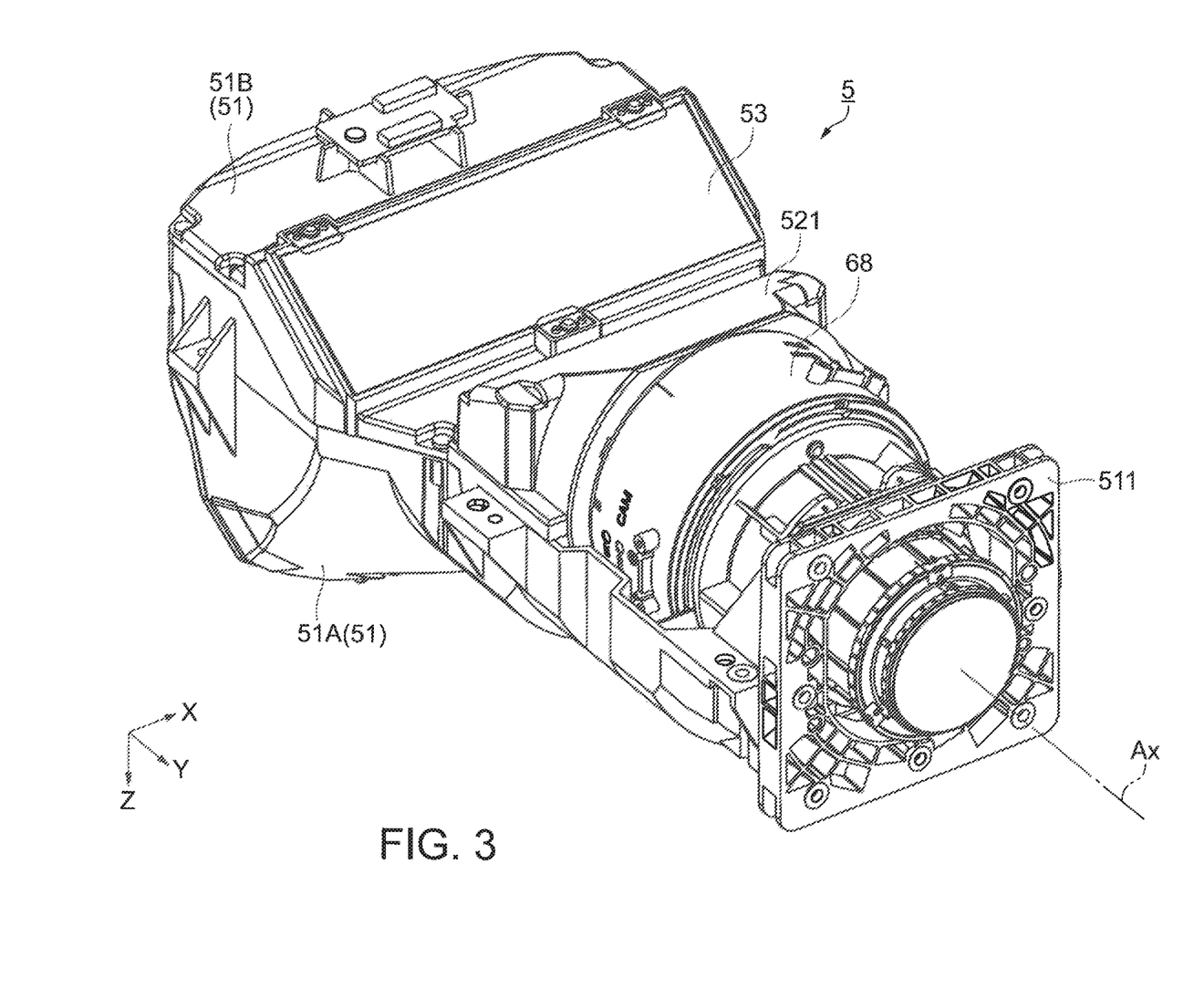
FIG. 3 is a perspective view of a projection optical device of the embodiment.
Figure 4:
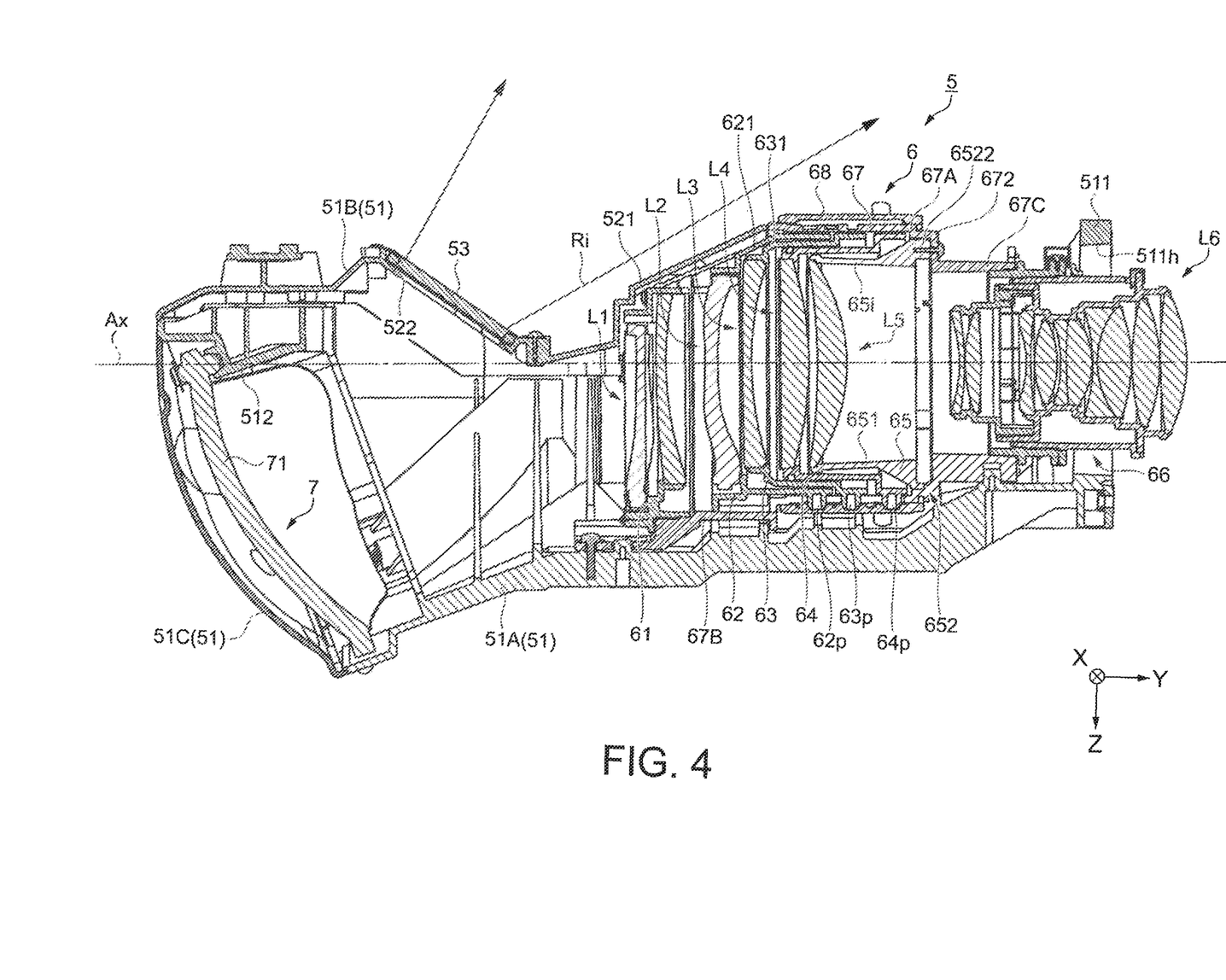
FIG. 4 is a sectional view of the projection optical device of the embodiment.

FIG. 3 is a perspective view of the projection optical device 5. FIG. 4 is a sectional view of the projection optical device 5 on a Y-Z plane containing the optical axis Ax.

As shown in FIGS. 3 and 4, the projection optical device 5 includes the first optical system 6 having the plurality of lens groups, each lens group including one or a plurality of lenses, provided along the optical axis Ax and the second optical system 7 that reflects the light output from the first optical system 6. Note that, as shown in FIG. 1, in the projector 1 supported by the support Mt provided on the wall surface, the directions along the optical axis Ax are ±Y-directions, and, in the first optical system 6, the upstream side in the optical path into which the light combined in the cross dichroic prism 352 enters is the +Y side and the downstream side in the optical path (second optical system 7 side) from which the light is output is the −Y side.

As shown in FIGS. 3 and 4, the projection optical device includes a projection optical casing 51 and a light-transmissive plate 53 in addition to the first optical system 6 and the second optical system 7.

Figure 5:
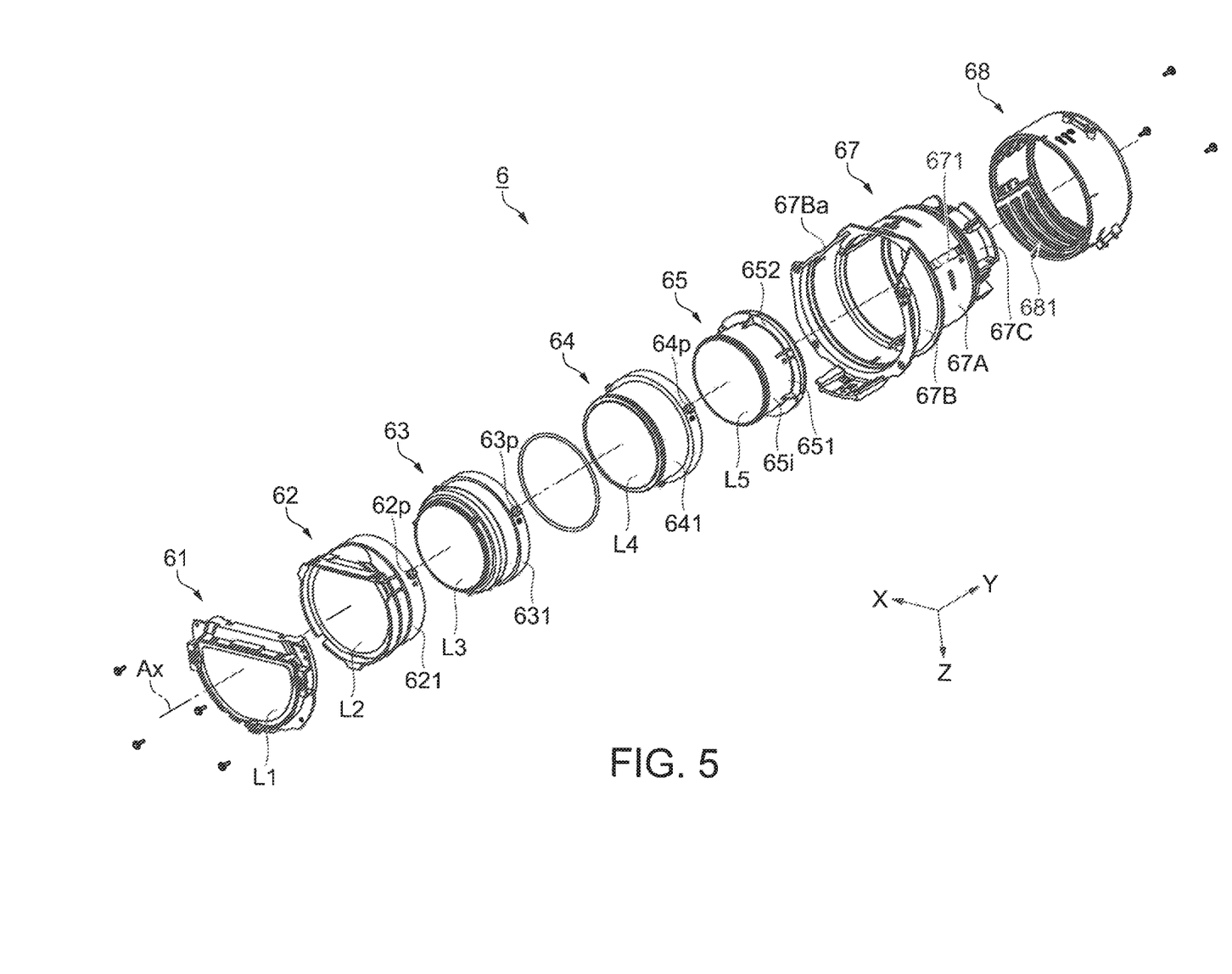
FIG. 5 is an exploded perspective view of a first optical system of the embodiment.

FIG. 5 is an exploded perspective view of the first optical system 6.

As shown in FIGS. 4 and 5, the first optical system 6 includes first to sixth lens groups L1 to L6 sequentially provided from the downstream side in the optical path (−Y side) toward the upstream side in the optical path (+Y side) along the optical axis Ax, first to six lens frames 61 to 66 that respectively hold the first to sixth lens groups L1 to L6, a guide tube 67, and a cam tube 68. Note that, in FIG. 5, the sixth lens group L6 and the six lens frame 66 are omitted.

The first lens group L1 includes two lenses and each has a shape formed by removal of a part on the −Z side from a circular shape in the plan view. Further, one lens of the two lenses forming the first lens group L1 is formed using an aspheric lens made of a synthetic resin.

The first lens frame 61 has a shape formed by removal of a part on the −Z side and holds the first lens group L1, and is fixed to the guide tube 67.

Each of the second to fourth lens groups L2 to L4 includes one lens and contributes to focus adjustment. Further, the second lens group L2 has a shape formed by removal of a part on the −Z side from a circular shape in the plan view.

The second to fourth lens frames 62 to 64 respectively hold the second to fourth lens groups L2 to L4 and are adapted to be movable along the optical axis Ax.

As shown in FIGS. 4 and 5, the second lens frame 62 includes a tubular holding part 621 that holds the second lens group L2 and a plurality of cam pins 62p that protrude from the holding part 621 in a direction orthogonal to the optical axis Ax.

Like the second lens frame 62, the third lens frame 63, the fourth lens frame 64 include tubular holding parts 631, 641 that respectively hold the third lens group L3, fourth lens group L4 and pluralities of cam pins 63p, 64p that protrude from the respective holding parts 631, 641 in directions orthogonal to the optical axis Ax.

Three of the respective cam pins 62p, 63p, 64p are provided at nearly equal intervals of 120° in the circumferential direction around the optical axis Ax, and the tip end portions are tapered and set to lengths protruding from a rectilinear groove 671 of the guide tube 67, which will be described later.

The fifth lens group L5 includes one lens (fixed lens) and is provided near the upstream side in the optical path of the fourth lens group L4.

The fifth lens group L5 is provided near the fourth lens group L4, and thereby, the fifth lens group may be formed using a lens having a larger outer diameter than that in the configuration in which the fifth lens group is provided apart from the fourth lens group L4 without upsizing of the projection optical device 5. Therefore, the fifth lens group L5 has high refractive power and optically high sensitivity performance.

The fifth lens frame 65 is formed in a tubular shape, holds the fifth lens group L5, and is supported by the guide tube 67. As described above, the fifth lens group L5 is provided adjacent to the fourth lens group L4 movable along the optical axis Ax, held in the position is maintained within the projection optical device 5 by the fifth lens frame 65. The fifth lens group L5 corresponds to a fixed lens group and the fifth lens frame 65 holding the fixed lens group corresponds to a fixed frame. Further, the fourth lens group L4 movably provided adjacent to the fixed lens corresponds to a mobile lens group and the fourth lens frame 64 holding the mobile lens group corresponds to a mobile frame.

The sixth lens group L6 includes a plurality of lenses. The sixth lens frame 66 includes a plurality of members, and holds the sixth lens group L6 and is fixed to the guide tube 67.

The guide tube 67 is made of a synthetic resin and has opening parts in the forward and backward directions (±Y-directions), and, as shown in FIGS. 4 and 5, has a cylindrical fit-insertion portion 67A fit-inserted into the cam tube 68, a tube protrusion portion 67B provided on the −Y side of the fit-insertion portion 67A and having a shape formed by removal a part of a cylindrical shape, and a cylindrical attachment portion 67C provided on the +Y side of the fit-insertion portion 67A. The fit-insertion portion 67A corresponds to a first tubular portion and the attachment portion 67C corresponds to a second tubular portion.

The tube protrusion portion 67B has an outer diameter larger than an outer diameter of the fit-insertion portion 67A and is formed to protrude from the cam tube 68 toward the −Y side. In the fit-insertion portion 67A, as shown in FIG. 5, the rectilinear groove 671 extending in a direction parallel to the optical axis Ax is provided from a step portion formed by the fit-insertion portion 67A and the tube protrusion portion 67B toward the +Y-direction. Three of the rectilinear grooves 671 are provided at nearly equal intervals of 120° in the circumferential direction around the optical axis Ax.

The inner diameter of the fit-insertion portion 67A is set to be a size in which the fifth lens frame 65, holding parts 641, 631, 621 can be inserted, and the inner diameter of the tube protrusion portion 67B is set to be a size in which the respective whole fourth lens frame 64, third lens frame 63, second lens frame 62 can be inserted.

The attachment portion 67C has an inner diameter and an outer diameter respectively smaller than the inner diameter and the outer diameter of the fit-insertion portion 67A and is formed to protrude from the cam tube 68 toward the +Y side.

The fifth lens frame 65, fourth lens frame 64, third lens frame 63, second lens frame 62, and first lens frame 61 are incorporated into the guide tube 67 in the order from the downstream side in the optical path.

Specifically, the fifth lens frame 65 is inserted from the tube protrusion portion 67B into the fit-insertion portion 67A and is fixed to the guide tube 67 with screws. The cam pins 64p, 63p, 62p of the fourth lens frame 64, third lens frame 63, and second lens frame 62 are inserted into the rectilinear grooves 671 and the +Y sides of the holding parts 641, 631, 621 are inserted into the fit-insertion portion 67A. The first lens frame 61 is fixed to an end part of the tube protrusion portion 67B with screws. Though the detailed explanation is omitted, the sixth lens frame 66 is fixed to the attachment portion 67C from the upstream side in the optical path via a member. Note that the guide tube 67 is not limited to that made of the synthetic resin, but may be made of a metal including aluminum.

The cam tube 68 is made of a synthetic resin and, as shown in FIGS. 4 and 5, has the opening parts in the forward and backward directions (±Y-directions), into which the fit-insertion portion 67A of the guide tube 67 is fit-inserted, and is formed rotatably about the optical axis Ax with respect to the guide tube 67. Further, cam grooves 681 with which the cam pins 62p, 63p, 64p protruding from the rectilinear grooves 671 engage are formed in the inner surface of the cam tube 68. The sectional shapes of the cam grooves 681 are formed so that the tapered tip end portions of the cam pins 62p, 63p, 64p may engage.

The cam grooves 681 have introduction portions extending in the direction parallel to the optical axis Ax for introducing the cam pins 62p, 63p, 64p and regulation portions branched from the introduction portions for regulating respective movements of the second lens frame 62, third lens frame 63, and fourth lens frame 64.

A lever (not shown) is attached to the cam tube 68 and the cam tube 68 is rotated when the lever is operated from outside of the projector 1.

When the cam tube 68 is rotated, the cam pins 62p, 63p, 64p are guided by the rectilinear grooves 671 and the cam grooves 681, and the second lens frame 62, third lens frame 63, fourth lens frame 64 move independently of one another along the optical axis Ax and focus adjustment is performed. Note that the focus adjustment here may be adjustment including adjustment of curvature of field, not limited to the adjustment of focal length. The cam tube 68 is not limited to that made of the synthetic resin, but may be made of a metal including aluminum. Zoom adjustment of the projector 1 of the embodiment is performed according to an electronic zoom method of enlarging and reducing images by image processing by an input operation unit (not shown) provided in the exterior casing 2 or operation of a remote control (remote) for remote operation of the projector 1.

As shown in FIG. 4, the second optical system 7 includes a reflection mirror 71. The reflection mirror 71 is formed to have a concave surface, and widens the angle of the light output from the first optical system 6 and reflects the light and allows the light to path near the first optical system 6. Note that the second optical system 7 may include a plurality of mirrors or a plane mirror.

As shown in FIG. 4, the projection optical casing 51 includes a casing main body 51A, an upper cover 51B, and a front cover 51C, and houses the first optical system 6 and the second optical system 7.

As shown in FIGS. 3, 4, the casing main body 51A is formed in a box shape opening on the −Z side, a flange part 511 in a rectangular shape in the plan view is formed on the +Y side and an opening part 512 closed by the reflection mirror 71 is provided in a wall part on the −Y side. In the flange part 511, an insertion hole 511h through which the sixth lens frame 66 of the first optical system 6 is inserted is formed and the optical device 35 is attached to the surface of the flange part 511 on the +Y side via a holding member (not shown).

The first optical system 6 is provided within the casing main body 51A with the guide tube 67 fixed to the casing main body 51A with screws. The reflection mirror 71 is fixed to the casing main body 51A with screws via a member such as a plate spring.

As shown in FIGS. 3, 4, the upper cover 51B is formed to close the −Y side of the part opening on the −Z side in the casing main body 51A, and and exposes the −Z side of the cam tube 68.

In the upper cover 51B, an opening part 522 through which the light reflected by the reflection mirror 71 passes and a slanted part 521 are formed.

The opening part 522 is formed in a rectangular shape in the plan view and is closed by a light-transmissive plate 53 formed by a plate material of glass or the like.

The slanted part 521 is further slanted closer to the optical axis Ax from the vicinity of the end of the cam tube 68 on the −Y side toward the second optical system 7 not to block the light reflected by the reflection mirror 71 and transmitted through the light-transmissive plate 53. Further, the slanted part 521 is set to be nearly parallel to a ray Ri closest to the first optical system 6 side of the light reflected by the reflection mirror 71.

As shown in FIG. 4, the front cover 51C is attached to the casing main body 51A to cover the opposite side to the reflection surface of the reflection mirror 71.

The light output from the cross dichroic prism 352 is refracted by the first optical system 6 and travels in a direction tilted toward the +Z side from the optical axis Ax. Then, the light output from the first optical system 6 is reflected by the second optical system 7, travels in a direction tilted toward the −Z side from the optical axis Ax, and is transmitted through the light-transmissive plate 53 and projected on the screen SC.

Here, the second to fifth lens frames 62 to 65 and the guide tube 67 are explained in detail.

As shown in FIGS. 4, 5, the second lens frame 62 holds the second lens group L2 in the vicinity of the end of the holding part 621 on the −Y side, and the cam pins 62p are provided in the vicinity of the end of the holding part 621 on the +Y side. Further, regarding the second lens frame 62, as shown in FIG. 4, the −Y side and the second lens group L2 protrude from the cam tube 68 and the +Y-side is fit-inserted into the guide tube 67. The second lens frame 62 is formed by cutting out of a part of the section protruding from the cam tube 68, i.e., the section located inside of the slanted part 521 of the upper cover 51B. In other words, the cam tube 68 has a shape in which the extension toward the −Y side (the downstream side in the optical path) is suppressed, and thereby, the second lens frame 62 may have a shape formed by removal of the side on which the reflected light from the second optical system 7 passes in the section protruding from the cam tube 68.

The third lens frame 63 has the holding part 631 with the outer diameter formed to be smaller on the +Y side than the −Y side, and, like the second lens frame 62, holds the third lens group L3 in the vicinity of the end of the holding part 631 on the −Y side and the cam pins 63p are provided in the vicinity of the end of the holding part 631 on the +Y side. Further, regarding the third lens frame 63, as shown in FIG. 4, the −Y side of the holding part 631 and the third lens group L3 are inserted into the holding part 621 of the second lens frame 62 and the +Y-side is fit-inserted into the guide tube 67.

The fourth lens frame 64 (mobile frame) has the holding part 641 with the outer diameter formed to be smaller on the −Y side than the +Y side like the third lens frame 63, and holds the fourth lens group L4 (mobile lens group) in the vicinity of the end of the holding part 641 on the −Y side and the cam pins 64p are provided in the vicinity of the end of the holding part 641 on the +Y side. Further, regarding the fourth lens frame 64, as shown in FIG. 4, the −Y side of the holding part 641 and the fourth lens group L4 are inserted into the holding part 631 of the third lens frame 63 and the +Y-side is fit-inserted into the guide tube 67.

As shown in FIG. 5, the fifth lens frame 65 has a cylindrical part 651 and a flange part 652 having a circular shape in the plan view provided on the +Y-side of the cylindrical part 651, and, as shown in FIG. 4, the −Y-side of the cylindrical part 651 is formed to be inserted into the holding part 641 of the fourth lens frame 64. Further, the fifth lens frame 65 holds the fifth lens group L5 (fixed lens group) in the vicinity of the end of the cylindrical part 651 on the −Y side. That is, regarding the fifth lens frame 65 (fixed frame), the −Y side of the cylindrical part 651 serves as an insertion portion 65i inserted into the fourth lens frame 64 (mobile frame) and the insertion portion 65i holds the fifth lens group L5 (fixed lens group).

As described above, the third to fifth lens frames 63 to 65 are formed so that the downstream side in the optical path (−Y-side) may be inserted into the lens frame adjacent to the optical axis Ax on the downstream side in the optical path.

Further, the fifth lens group L5 (fixed lens group) is provided between the cam pins 64p of the fourth lens frame 64 (mobile frame) and the fourth lens group L4 (mobile lens group) on the upstream side in the optical path of the fourth lens group L4 (mobile lens group) within the fourth lens frame 64 (mobile frame), specifically, in the direction along the optical axis Ax. Furthermore, the fifth lens group L5 (fixed lens group) is also provided within the cam tube 68 and is further provided between the cam pins 63p of the third lens frame 63 and the fourth lens group L4 (mobile lens group) in the direction along the optical axis Ax.

Figure 6:
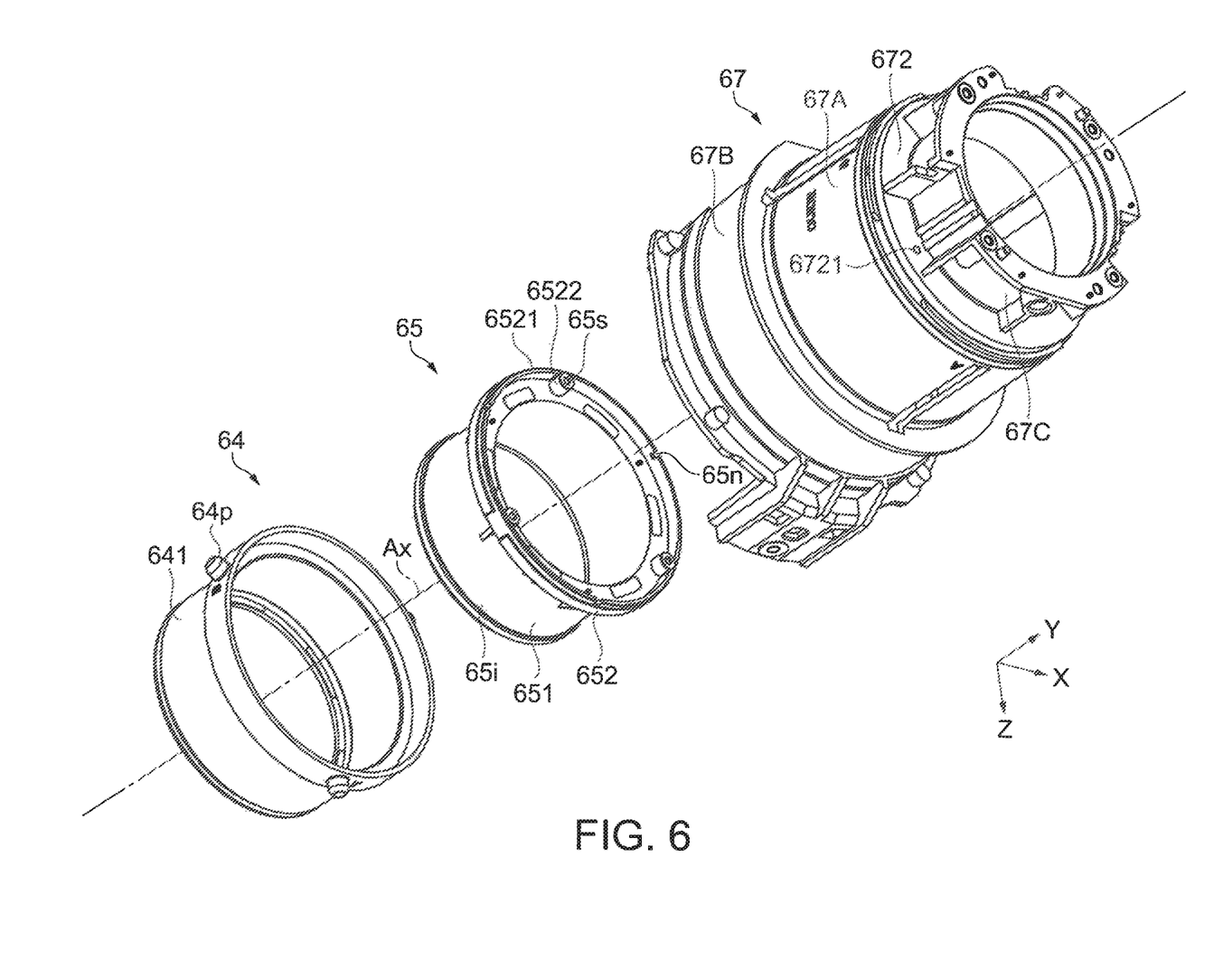
FIG. 6 is a perspective view of a fourth lens frame, a fifth lens frame, and a guide tube of the embodiment.

FIG. 6 is a perspective view showing the fourth lens frame 64, the fifth lens frame 65, and the guide tube 67 as seen from a direction different from that shown in FIG. 5.

In a flange part 652, as shown in FIG. 6, a standing portion 6521 standing along the peripheral edge and circular bosses 6522 with screw holes 65s formed at the centers are provided on the +Y side. Further, three cutouts 65n are formed at nearly equal intervals of 120° in the circumferential direction around the optical axis Ax.

The three of the bosses 6522 are provided inside of the standing portion 6521 at nearly equal intervals of 120° in the circumferential direction around the optical axis Ax to extend in the direction parallel to the optical axis Ax.

As described above, the guide tube 67 has the fit-insertion portion 67A, the tube protrusion portion 67B, and the attachment portion 67C.

As shown in FIG. 4, the tube protrusion portion 67B has a shape formed by removal of a part so that the −Z sides of the sections of the first lens frame 61 and the second lens frame 62 protruding from the cam tube 68 may be exposed. Further, an end surface 67Ba (see FIG. 5) formed by the removal inclines according to the cutout section of the second lens frame 62 located inside of the slanted part 521 of the upper cover 51B.

As described above, the attachment portion 67C has the inner diameter and the outer diameter respectively formed to be smaller than the inner diameter and the outer diameter of the fit-insertion portion 67A, and, as shown in FIGS. 4, 6, a supporting part 672 that connects the fit-insertion portion 67A and the attachment portion 67C and supports the fifth lens frame 65 is formed in the guide tube 67.

In the supporting part 672, as shown in FIG. 6, screw insertion holes 6721 and engagement protrusions (not shown) are provided. Three of the screw insertion holes 6721 are provided in positions corresponding to the three screws 65c of the fifth lens frame 65. Three of the engagement protrusions (not shown) are formed on the inner surface of the supporting part 672 to engage with the three cutouts 65n of the fifth lens frame 65.

As described above, the fifth lens frame 65 is inserted from the downstream side in the optical path into the fit-insertion portion 67A, the engagement protrusions engage with the cutouts 65n and the position of the frame in the rotation direction about the optical axis Ax is determined, and screws inserted from the upstream side in the optical path into the screw insertion holes 6721 are screwed into the screw holes 65s and the frame is fixed to the guide tube 67.

As described above, regarding the second to fourth lens frames 62 to 64, the cam pins 62p to 64p are formed on one sides of the second to fourth lens groups L2 to L4, i.e., the upstream sides in the optical path in the direction along the optical axis Ax, respectively. The cam tube 68 is formed in a region covering from the +Y side of the third lens frame 63 to the fifth lens frame in the direction along the optical axis Ax. Further, the cam tube 68 is formed to cover from the fourth lens group L4 (mobile lens group) located on the uppermost stream side of the movable second to fourth lens groups L2 to L4 to the fifth lens group L5 (fixed lens group) adjacent to the fourth lens group L4 (mobile lens group). That is, the cam tube 68 is formed with suppressed extension to the downstream side in the optical path (second optical system 7 side) without covering the first to third lens groups L1 to L3.

Further, the second to fifth lens frames 62 to 65 are inserted into the fit-insertion portion 67A (first tubular portion) from the opposite side to the above described one side, i.e., the downstream side in the optical path in the direction along the optical axis Ax. The fifth lens frame 65 (fixed frame) is supported by the supporting part 672 that connects the fit-insertion portion 67A (first tubular portion) and the attachment portion 67C (second tubular portion) formed on one side of the fit-insertion portion 67A (first tubular portion).

As described above, according to the embodiment, the following advantages may be obtained.

(1) The projection optical device 5 can be downsized because the extension of the cam tube 68 to the downstream side in the optical path (second optical system 7 side) is suppressed.

Further, the projection optical device 5 has the fifth lens group L5 (fixed lens group) having optically high sensitivity performance near the fourth lens group L4 (mobile lens group), and projection of images with improved image quality can be performed. That is, the fifth lens group L5 in the position maintained within the projection optical device 5 has high sensitivity performance, and thereby, the optical sensitivity of the movable second to fourth lens groups L2 to L4 provided on the downstream side in the optical path of the fifth lens group L5 can be made lower. Thus, the projection optical device 5 that may exert stable optical performance can be provided without special works and special adjustment on the members in order to extremely improve the position accuracy of the second to fourth lens groups L2 to L4.

(2) The projection optical device 5 is adapted to hold the fifth lens group L5 (fixed lens group) by the fifth lens frame 65 (fixed frame) separately provided from the guide tube 67, and molding and assembly of component members are easier.

(3) The fifth lens frame 65 (fixed frame) and the fourth lens frame 64 (mobile frame) are inserted from the downstream side in the optical path into the fit-insertion portion 67A (first tubular portion), and the ends on the upstream side in the optical path are supported by the supporting part 672 and provided in the fit-insertion portion 67A. Thereby, the projection optical device 5 can be adapted to secure the configuration in which the fifth lens group L5 (fixed lens group) is provided within the fourth lens frame 64 (mobile frame) and allowing the guide tube 67 to support the sixth lens group L6 having the smaller outer diameter than the outer diameter of the fifth lens group L5 by the attachment portion 67C. Therefore, the projection optical device 5 with higher optical performance and reduced size can be provided.

(4) The projection optical device 5 has the second optical system 7, and the light of the first optical system 6 can be changed in direction or wide-angled by the reflection mirror 71. Therefore, the projection optical device 5 that can be provided close to the projection surface and wide-angled may be provided.

Further, the first optical system 6 may have the shape formed by removal of the side on which the reflected light from the second optical system 7 passes in the section protruding from the cam tube 68 of the second lens frame 62 because the extension of the cam tube 68 toward the downstream side in the optical path is suppressed. Thereby, the region in which the light reflected by the second optical system 7 is not blocked by the first optical system 6 may be formed to be larger and the projection optical device 5 that can be provided close to the projection surface and wide-angled may be provided.

(5) The projector 1 includes the above described projection optical device 5, and thereby, the projector with reduced size can be provided closer to the projection surface, and projection of images with better image quality at wider angles can be performed.

MODIFIED EXAMPLES

The above described embodiment may be changed as follows. The projection optical device 5 of the above described embodiment includes the six lens groups (first to sixth lens groups L1 to L6), however, may include, not limited to six, but five or less or seven or more lens groups.

Further, the projection optical device 5 of the above described embodiment includes the three movable lenses (second to fourth lens groups L2 to L4), however, may include, not limited to three, but two or less or four or more lenses.

The first lens group L1 of the above described embodiment has two lenses, however, may have one or three or more lenses. Further, the second to fourth lens groups L2 to L4 of the above described embodiment each has one lense, however, may have two or more lenses.

The fifth lens group L5 (fixed lens group) of the above described embodiment has one lens (fixed lens), however, may have two or more fixed lenses. Further, it is only necessary that the fixed lens closest to the mobile lens group side of the fixed lens groups is provided within the mobile frame. Or, the fixed lens closest to the mobile lens group side of the fixed lens group may be provided between the cam pins of the mobile frame and the mobile lens group in the direction along the optical axis Ax.

The projection optical device 5 of the above described embodiment includes the second optical system 7, however, a projection optical device without the second optical system 7 may be formed.

Further, the projection optical device 5 of the above described embodiment has the configuration in which the cam pins 64 of the mobile frame (fourth lens frame 64) are formed on the upstream side in the optical path of the mobile lens group and the fixed lens group is provided on the upstream side in the optical path of the mobile lens group within the mobile frame, however, the projection optical device without the second optical system 7 is not limited to the configuration. That is, in the adjacent mobile lens group and fixed lens group, the cam pins of the mobile frame may be formed on the downstream side in the optical path of the mobile lens group and the fixed lens group may be provided on the downstream side in the optical path of the mobile lens group within the mobile frame.

In the projection optical device 5 of the above described embodiment, the mobile lens group (fourth lens group L4) is adapted as the lens group that contributes to focus adjustment, however, the projection optical device may include a lens group that contributes to zoom adjustment and the lens group may have a mobile lens group. That is, the mobile lens group that contributes to zoom adjustment and the fixed lens group adjacent to the mobile lens group may be provided and the fixed lens group may be provided within the mobile frame holding the mobile lens group.

The cam tube 68 of the above described embodiment is adapted to be rotated by the lever operation from outside of the projector 1, however, the cam tube 68 may be rotated electrically using a motor or the like.

The projector 1 of the above described embodiment uses the transmissive liquid crystal panel as the light modulation device, however, may use a reflective liquid crystal panel. Or, a micromirror light modulation device, e.g. a DMD (Digital Micromirror Device) or the like may be used as the light modulation device.

The light modulation device of the above described embodiment employs the so-called 3-LCD system using three light modulation devices corresponding to R light, G light, and B light, however, the device is not limited to that. The single LCD system may be employed, or the light modulation device may be applied to a projector including two, four, or more light modulation devices.

The light source device 31 is not limited to that using the discharge lamp, but may include another type of lamp or solid light source such as a light emitting diode or laser.

REFERENCE SIGNS LIST

The entire disclosure of Japanese Patent Application No. 2015-065938, filed Mar. 27, 2015 is expressly incorporated by reference herein.

The invention claimed is:

1. A projection optical device having a plurality of lens groups provided along an optical axis, comprising:
   a mobile lens group movable along the optical axis;
   a fixed lens group provided adjacent to the mobile lens group in a position maintained within the projection optical device;
   a mobile frame holding the mobile lens group and having a cam pin protruding in a direction orthogonal to the optical axis;
   a guide tube having a rectilinear groove extending in a direction parallel to the optical axis, the cam pin inserted into the rectilinear groove; and
   a cam tube into which the guide tube is fit-inserted, having a cam groove with which the cam pin protruding from the rectilinear groove engages, rotated with respect to the guide tube to guide the cam pin with the rectilinear groove and the cam groove, and moving the mobile frame along the optical axis,
   wherein:
      the cam pin is formed on one side of the mobile lens group in a direction along the optical axis,
      a fixed lens closest to the mobile lens group side of the fixed lens group is provided within the mobile frame on the one side,
      a distance between the fixed lens group and the mobile lens group is smaller than a distance between the mobile lens group and the cam pin,
      the fixed lens group is provided upstream of the mobile lens group and downstream of the cam pin, and
      a third lens group is provided upstream of the fixed lens group and the cam pin, and the third lens group having a diameter smaller than a diameter of the fixed lens group.

2. The projection optical device according to claim 1, wherein the fixed lens is provided between the cam pin and the mobile lens group in the direction along the optical axis.

3. The projection optical device according to claim 1, further comprising a fixed frame holding the fixed lens group and supported by the guide tube,
   wherein the fixed frame has an insertion portion inserted into the mobile frame and holding the fixed lens with the insertion portion.

4. The projection optical device according to claim 3, wherein the guide tube has:
   a first tubular portion into which the fixed frame and the mobile frame can be inserted in this order from an opposite side to the one side;

a second tubular portion formed on the one side of the first tubular portion and having an inner diameter smaller than an inner diameter of the first tubular portion; and a supporting part that connects the first tubular portion and the second tubular portion and supports the fixed frame.

5. The projection optical device according to claim 1, wherein the one side is an upstream side in an optical path.

6. The projection optical device according to claim 5, further comprising:

a first optical system having the mobile lens group and the fixed lens group; and a second optical system that reflects light output from the first optical system.

7. The projection optical device according to claim 1, wherein the mobile lens group is a lens group that contributes to focus adjustment.

8. A projector comprising:

a light source;

a light modulation device that modulates light output from the light source according to image information; and the projection optical device according to claim 1 that projects the light modulated in the light modulation device.

* * * * *